Oct. 19, 1954  N. S. MOORE, JR  2,692,370
OPTICAL SYSTEM FOR OSCILLOGRAPHS
Filed June 27, 1950
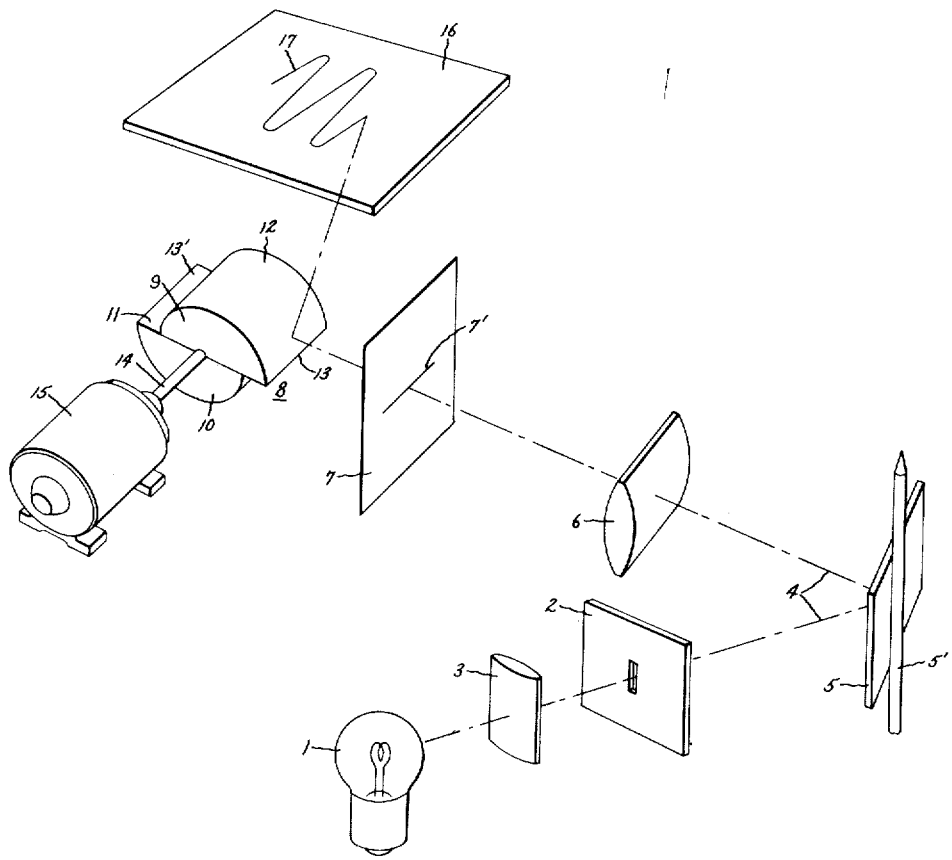
Inventor:
Nathaniel S. Moore, Jr.,
by Paul A. Frank
His Attorney.

Patented Oct. 19, 1954

2,692,370

UNITED STATES PATENT OFFICE 2,692,370

OPTICAL SYSTEM FOR OSCILLOGRAPHS

Nathaniel S. Moore, Jr., Scotia, N. Y., assignor to General Electric Company, a corporation of New York Application June 27, 1950, Serial No. 170,499

1 Claim. (Cl. 324—97)

This invention relates to oscillographs and more particularly to optical oscillographs of the type employing a beam of light to cause a trace to be directly viewed by an observer or photographed by a camera.

In many oscillographs of this optical type, a beam of light is deflected along one axis of a pair of Cartesian coordinates in accordance with an applied voltage function, and means are included whereby the resultant variations of the light beam are simultaneously deflected along the associated coordinate axis in order to provide a time base against which the applied voltage may be viewed.

Many difficulties, however, have been encountered in providing a simple and economical device which will cause a suitable time base deflection of this light beam. In order to facilitate the harmonic analysis of a resultant voltage wave, it is commonly desired that the rate of time base deflection be held substantially constant to provide a linear time base. It is also highly desirable that the "fly-back time" between each sweep of time base deflection be extremely short in order to provide a delineation of substantially the entire applied voltage function. In addition, the rate and position of each successive sweep of time base deflection should be uniform in order to prevent the production of an objectionable shift or flutter in the resultant trace.

One excellent system which solves many of these difficulties is the system disclosed in the copending patent application Serial No. 133,581, filed December 17, 1949, entitled "Optical System for Oscillographs," and assigned by the inventor, Kenneth R. Geiser, to the same assignee as this application. The system of this present application is an improvement and refinement of the system disclosed in that application, which will be hereinafter referred to as the "Geiser system." One of the most expensive components of the Geiser system is a non-uniform lens having a light-divergent characteristic at one end which is placed immediately behind a viewing screen to correct for differences in distances which the light beam travels to reach and focus on the viewing screen as a cylindrical segment deflection and sweeping device causes the beam to sweep across the screen.

Accordingly, one object of this invention is to provide a new and improved optical system for an oscillograph.

Another object of this invention is to provide a light beam time base deflecting system for the above type oscillograph which causes each successive sweep of time base deflection to occur at a uniform rate and to fall in an identical position.

Another object of this invention is to provide a time base deflecting device optical system for an oscillograph having a linear rate of time base deflection when viewed by an observer, without requiring the use of a non-uniform correction lens between the deflecting device and the oscillograph observer.

One of the principal features of the Geiser system is a light beam deflecting cam comprising a pair of convex mirrors which are shaped in the form of identical cylinder segments and joined in an offset back-to-back manner so that their longitudinal center lines do not coincide. This light cam is rotated about its longitudinal axis and a light beam which is incident upon the cam from a predetermined direction is deflected at continually varying angles of reflection by the continually changing curvature of the mirrors at the point of incidence. Since the two halves of the cam are identically constructed and similarly mounted with respect to the axis of rotation, an identical sweep of light beam deflection is produced during each half revolution of the cam. This deflected light beam may be viewed by a camera or by an observer. If the light cam is rotated at a sufficiently high speed, the resultant trace appears to be continuous.

The novel features which are believed to be characteristic of this invention are set forth with particularity in the appended claim. The invention itself, however, together with further objects and advantages thereof, can best be understood by reference to the following description taken in connection with the accompanying drawing, which is a perspective view of an oscillograph optical system embodying my invention.

Referring more particularly to the drawing, I have shown an oscillograph optical system comprising a light source such as lamp 1, a light directing means such as an apertured plate 2 and a light converging lens 3 which are arranged to provide a beam of light such as schematically indicated by the dashed lines 4. This beam of light 4 impinges upon a galvanometer mirror 5 which is pivotally arranged, as on a pivot 5', to be oscillated by a galvanometer in response to a voltage function supplied to the galvanometer. The galvanometer and the galvanometer mirror 5 may be of any conventional type commonly employed in optical oscillographs.

The light beam 4 reflected from the mirror 5 is deflected in a well-known manner by the oscillation of the mirror 5 about pivot pin 5' to move within a particular plane of deflection, such as the horizontal. A second light converging lens 6 is preferably arranged to intercept this reflected light beam 4 and to focus the beam as a horizontally moving spot upon a translucent light diffusing viewing screen, causing a horizontal trace on the screen indicated at 7'. This horizontally moving spot is seen by an observer or by a recording camera by reflection from a light cam 8 as will be more fully described below.

The light cam 8 comprises a pair of identical convex mirrors 9 and 10 joined in an offset back-to-back manner as illustrated. Each mirror is constructed of glass or any other suitable material having a highly polished surface, and shaped in the form of a longitudinal segment or portion of a cylinder. Each mirror preferably has a flat back 11 and an arcuate silvered outer surface 12 covered with a thin coating of transparent protective material such as silicon monoxide, although the mirrors may alternatively be constructed as transparent hollow tube segments silvered on the inside. The mirrors are joined so that their respective longitudinal edges 13 and 13' are parallel and in the same plane but do not coincide. Although I have illustrated the mirrors 9 and 10 as being shaped in the form of half cylinders, it will be appreciated that the light cam may be alternatively formed by the joinder of any pair of mirrors shaped in the form of longitudinal cylinder segments.

The light cam 8 is located so that its longitudinal dimension is parallel to the trace 7' of the spot focused on screen 7, and is supported for rotation about a longitudinal axis midway between the joined portions of the mirrors by such means as an axle 14. That is, the axes of the mirrors are equally displaced from the axis of rotation in opposite directions and are parallel both to the axis of rotation and to the line trace of the spot focused on the screen 7. The light cam 8 is revolved at a predetermined constant speed by any suitable propulsion means such as a motor 15.

The moving spot focused on screen 7 may be viewed by an observer through a viewing glass 16 as it is redeflected by the rotation of the light cam 8. For a more detailed explanation of the construction and operation of the light cam 8, reference should be had to the Geiser system patent application referred to above where the "sweep" operation of this light cam is described.

If the galvanometer is oscillated in accordance with a varying input voltage, the resulting corresponding varying trace 7' of the spot focused on screen 7 will be viewed by the observer through the viewing glass 16 as redeflected by the light cam 8 as a trace varying with reference to a time base, as illustrated by curve 17 for a simple sinusoidal input voltage. In other words, the light cam 8 spreads the trace 7' focused in screen 7 so that the instantaneous individual input voltage variations to which the galvanometer responds are separately viewable with respect to a time base. The viewing glass 16 is of clear glass and the curve 17 is not an actual trace viewable thereon. Curve 17 is shown for illustrative purposes only. Actually, the eye of the observer, or the recording camera, must focus on the screen 7 through the glass 16 and reflected by light cam 8 to discern the moving spot which forms the trace 7'. The curve 17 is merely to illustrate what an observer sees due to the "sweep" action of the light cam 8. Viewing glass 16 may therefore actually be eliminated, but will normally be used as a portion of the protective casing around the oscillograph. Glass 16 may, however, alternatively be constructed as a magnifying lens in order to facilitate the oscillograph observations with a very compact oscillograph structure. However, the use of a plain glass or a magnifying glass 16 is not essential to the operation of the oscillograph optical system of this invention.

No lenses are therefore required, in the optical system of this invention, between the observer who views the oscillograph trace and the screen 7 on which the galvanometer spot is focused. Only the two standard lenses 3 and 6 are employed in the system. An oscillograph having the optical system of this invention is therefore economically manufactured and easily and simply adjusted, providing very satisfactory operation as an optical oscillograph.

While the present invention has been described by reference to a particular embodiment thereof, it will be understood that numerous modifications may be made by those skilled in the art without actually departing from the invention. It is, therefore, the aim in the appended claim to cover all such equivalent variations as come within the true spirit and scope of the invention.

What I claim as new and desire to secure by Letters Patent of the United States is:

An optical viewing system including a light beam source, a mirror positioned to intercept the light beam from said light beam source, said mirror being arranged to oscillate in accordance with a signal voltage to deflect said light beam within a predetermined plane, a translucent light diffusing screen, means for focusing said light beam as a moving spot on one side of said screen, a light cam located in spaced relation to the opposite side of said screen comprising a pair of convex mirrors shaped in the form of longitudinal segments of a cylinder and supported in back-to-back relation so that their longitudinal axes are mutually parallel to and equally displaced in opposite directions from a central longitudinal axis of said cam, said light cam being arranged to receive an image of said spot diffused through said screen with the central longitudinal axis of said cam parallel to said plane of beam movement, and means to rotate said light cam about said central longitudinal axis thereby to redeflect said moving image of said light beam with continually changing angles relative to an observer viewing said cam.

References Cited in the file of this patent

UNITED STATES PATENTS

| Number | Name | Date |
| --- | --- | --- |
| 1,740,406 | Kellogg | Dec. 17, 1929 |
| 1,787,920 | Watson | Jan. 6, 1931 |
| 1,899,804 | Hopfield | Feb. 28, 1933 |
| 1,913,200 | Hathaway | June 6, 1933 |
| 1,942,059 | Hathaway | Jan. 2, 1934 |
| 2,010,307 | Leishman | Aug. 6, 1935 |
| 2,073,637 | Hoorn | Mar. 16, 1937 |
| 2,234,430 | Ellis | Mar. 11, 1941 |
| 2,496,404 | Paillais | Feb. 7, 1950 |
| 2,613,127 | Geiser | Oct. 7, 1952 |

FOREIGN PATENTS

| Number | Country | Date |
| --- | --- | --- |
| 472,417 | Great Britain | Sept. 23, 1937 |

OTHER REFERENCES

Television Today, article from "International Projectionist," vol. 19, No. 7, July 1944, pages 20 and 21.